Sept. 1, 1959  L. A. WILKINSON  2,901,955
SHUTTER MECHANISM
Original Filed July 29, 1949  5 Sheets-Sheet 1

INVENTOR
Leonard A. Wilkinson
By Strauch, Nolan + Diggins
Attorneys

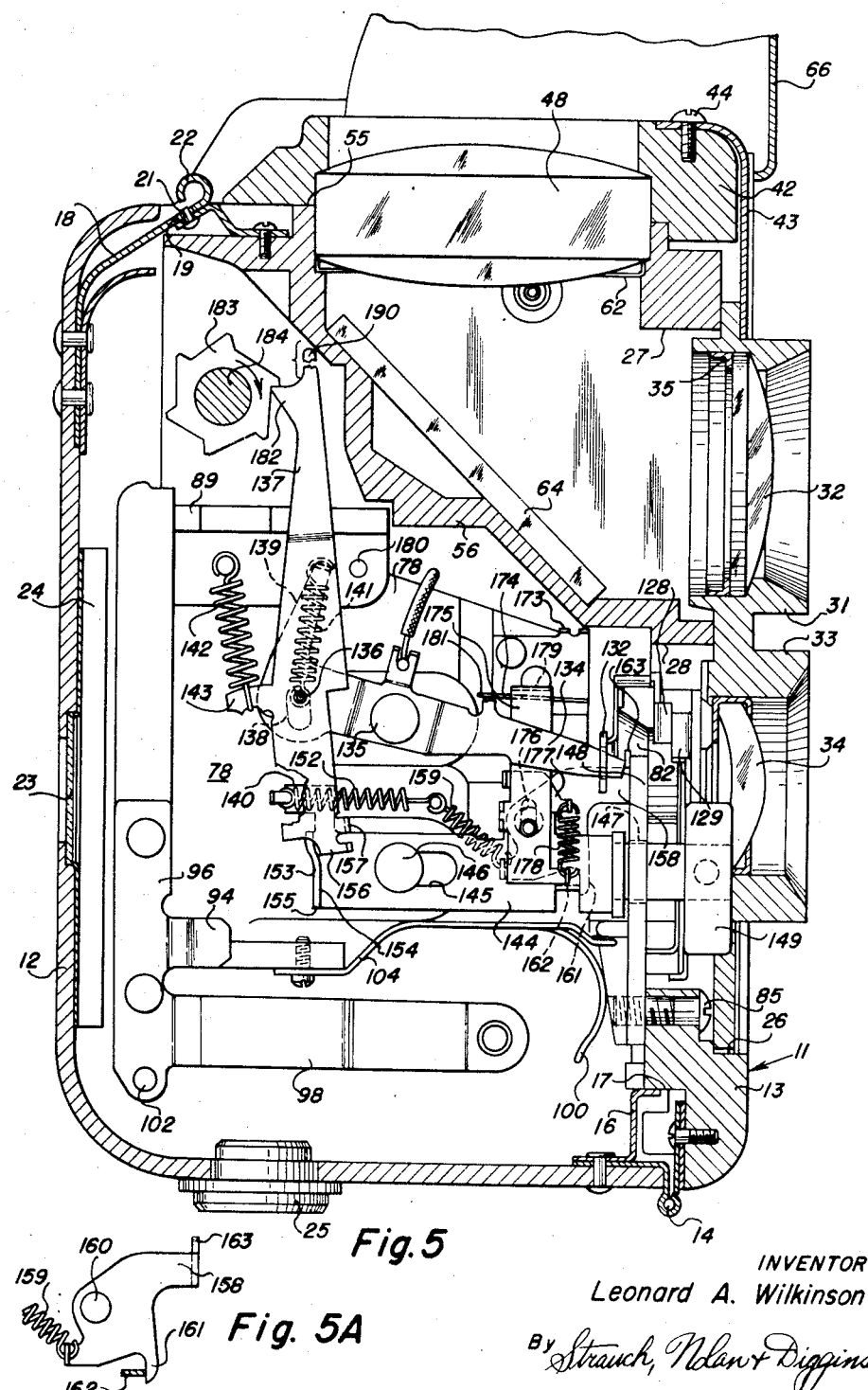

Sept. 1, 1959    L. A. WILKINSON    2,901,955
SHUTTER MECHANISM
Original Filed July 29, 1949    5 Sheets-Sheet 3
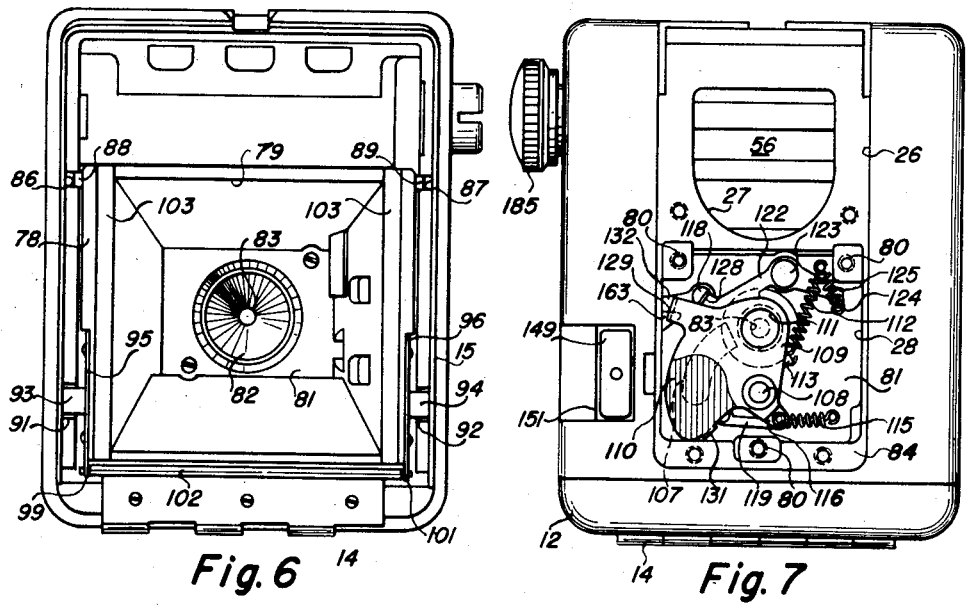
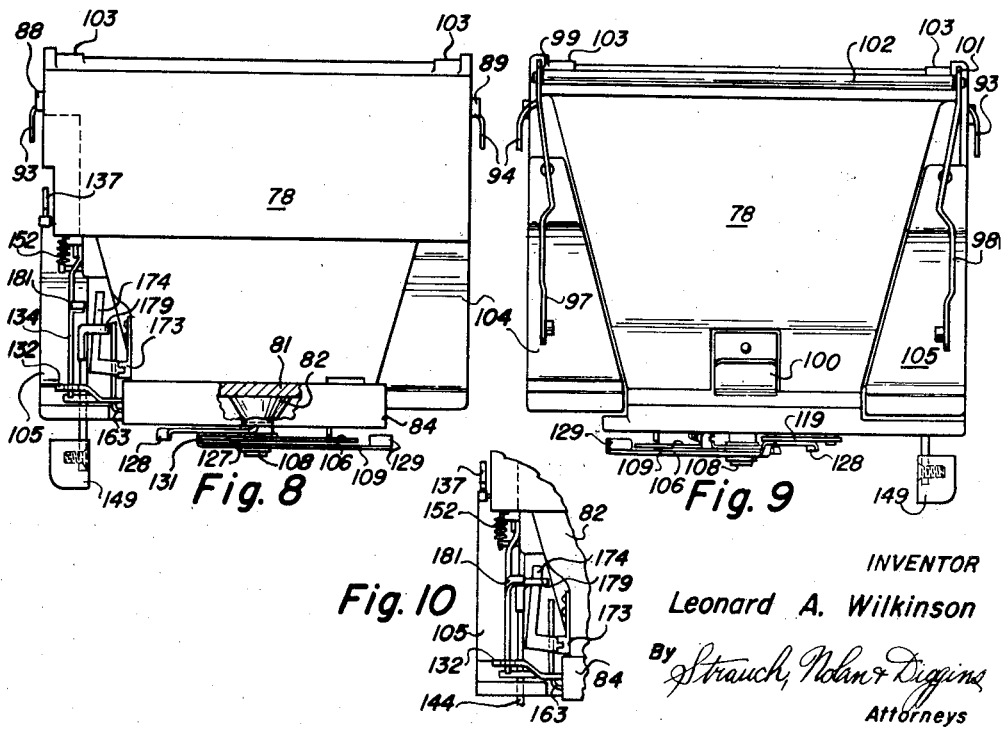
INVENTOR
Leonard A. Wilkinson
By Strauch, Nolan & Diggins
Attorneys

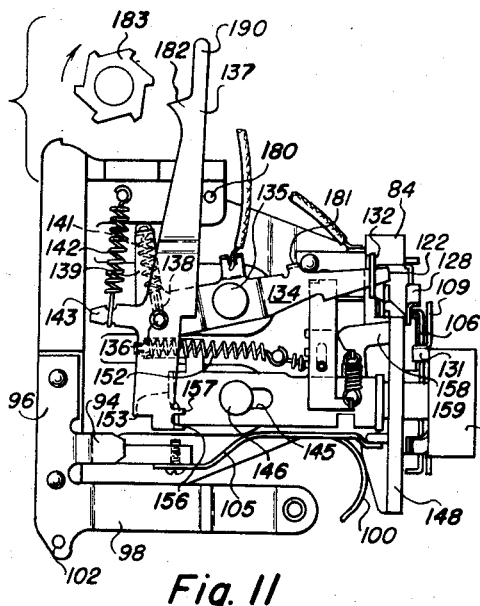
Fig. 11
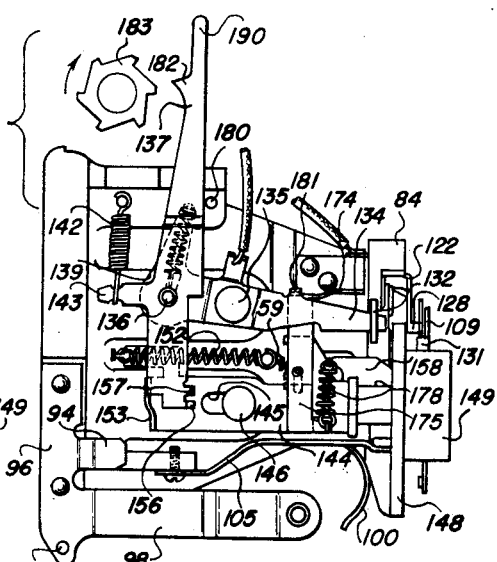
Fig. 14
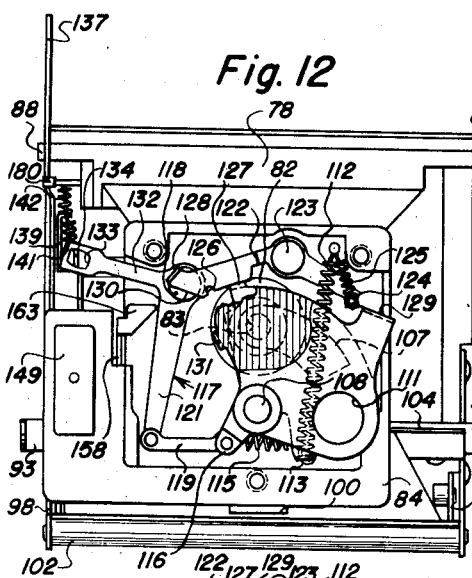
Fig. 12
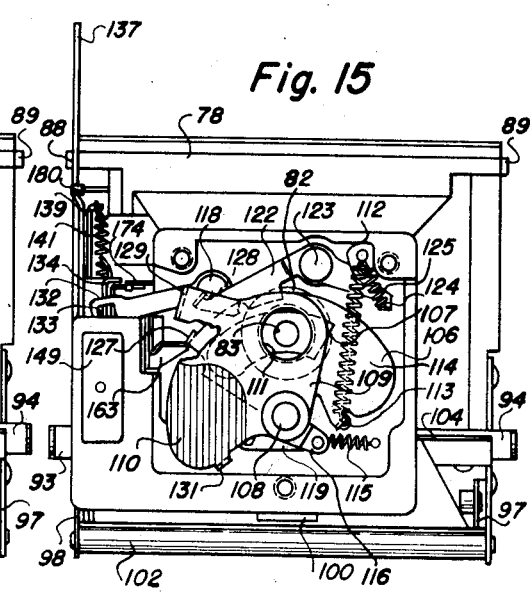
Fig. 15
Fig. 13
INVENTOR
Leonard A. Wilkinson
By Strauch, Nolan & Diggins
Attorneys Sept. 1, 1959

L. A. WILKINSON 2,901,955

SHUTTER MECHANISM

Original Filed July 29, 1949

INVENTOR
Leonard A. Wilkinson

By Strauch, Nolan+Diggins
Attorneys

United States Patent Office 2,901,955
Patented Sept. 1, 1959

2,901,955
SHUTTER MECHANISM

Leonard A. Wilkinson, Ann Arbor, Mich., assignor, by mesne assignments, to Sylvania Electric Products Inc., Wilmington, Del., a corporation of Delaware Original application July 29, 1949, Serial No. 107,519, now Patent No. 2,664,799, dated January 5, 1954. Divided and this application July 10, 1953, Serial No. 367,150

13 Claims. (Cl. 95—60)

This invention relates to cameras and is more particularly directed to novel shutter mechanism.

This is a division of my copending application Serial No. 107,519, filed July 29, 1949, and entitled "Camera With Film Wind and Shutter Set Interlock," now United States Letters Patent No. 2,664,799, issued January 5, 1954.

It is the major object of my invention to provide a novel cover blade type camera shutter mechanism.

It is a further object of my invention to provide a novel camera sub-assembly wherein the shutter and associated control mechanism are mounted on a member adapted to be removably secured to the interior of the camera body.

A further object of my invention is to provide a novel mechanism for controlling a cover blade type shutter.

A further object of my invention is to provide a novel photo-flash synchronization mechanism in operative association with a cover blade type shutter assembly in a camera.

It is another object of my invention to provide a novel shutter control mechanism for preselecting instantaneous or time exposure operation in a camera.

Further objects of the invention will presently appear as the description proceeds in connection with the appended claims and the annexed drawings wherein:

Figure 5 is an enlarged section substantially through the middle of the camera illustrating details of the body construction as well as certain details of the shutter and film feed interlock;

Figure 5A is a fragmentary view illustrating the time stop lever;

Figure 6 is a rear elevation of the camera with the back cover removed;

Figure 7 is a front elevation of the camera with the lens board removed to illustrate the shutter and associated parts as they appear after an exposure has been made;

Figure 8 is a top plan view of the support upon which the shutter and shutter control mechanism are built in a sub-assembly;

Figure 9 is a bottom plan view of the shutter support sub-assembly of Figure 8 illustrating particularly the arms for holding the supply film roll;

Figure 10 is a fragmentary top plan view of the shutter linkage and particularly illustrating the photo-flash synchronization switch in the assembly;

Figure 11 is a side elevation of the sub-assembly of Figure 8 illustrating the position of the parts after the film has been wound to cock the shutter;

Figure 12 is a front elevation of the sub-assembly of Figure 8 illustrating the position of the shutter parts that correspond to the shutter cocked position of Figure 11;

Figure 13 is a fragmentary front elevation illustrating the position of the parts as the cover blade moves to trip the shutter blade in making an instantaneous exposure;

Figure 14 is a side elevation of the sub-assembly similar to Figure 11 but illustrating the position of the parts after the shutter has been tripped and an instantaneous exposure has been made;

Figure 15 is a front elevation of the sub-assembly illustrating the parts in the position they assume after the shutter is tripped to make a time exposure;

Figure 1:
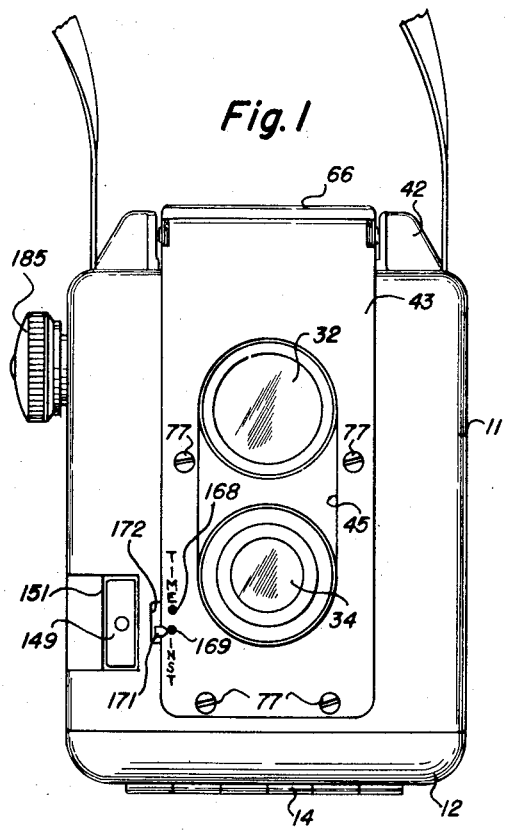
Figure 1 is a front elevation of a camera constructed according to a preferred embodiment of the invention.
Figure 3:
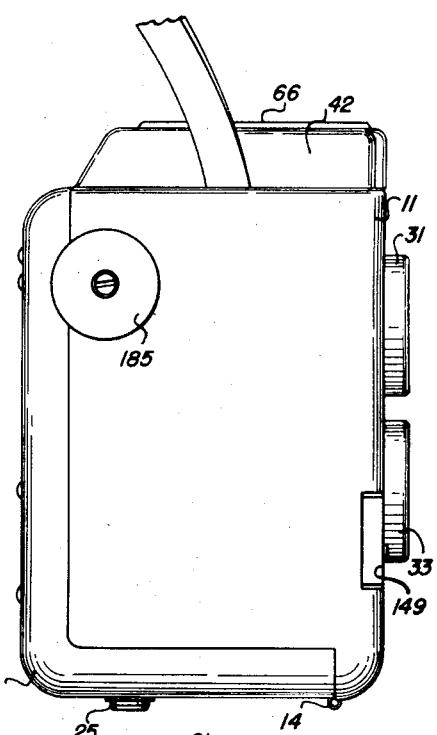
Figure 3 is a side elevation of the camera of Figure 1.

The camera according to the preferred embodiment of the invention comprises a main casing or body 11 which is preferably a molded phenolic condensation product or other plastic that is closed at the bottom and rear by a cover 12 pivoted to the lower end of front casing wall 13 (Figure 5) by a suitable hinge 14. Cover 12 serves as the bottom and rear walls of the camera and its side edges are internally grooved to fit light tight over edge ribs 15 (Figure 6) on adjacent walls of the camera when the cover is closed.

A light baffle plate 16 (Figure 5) is secured all along the inner lower edge of cover 12 adjacent hinge 14 and extends into an internal recess 17 in the lower end of wall 13 to block light that may pass through the hinge when cover 12 is closed. A spring latch plate 18 has one end riveted or similarly anchored to the upper part of cover 12 and provided with an aperture 19 adapted to fit over a spring plate mounted keeper pin 21 when cover 12 is closed to latch the cover in closed position. The upper end of plate 18 is turned over at 22 to provide a finger piece for releasing the latch when cover 12 is to be opened.

The rear wall of cover 12 has an aperture (Figure 5) covered by a red filter 23 through which the usual indicia on the back of the film may be observed, and a suitable resilient film presser plate 24 is secured to the interior of cover 12 to maintain the film flat at the exposure aperture. A suitable tripod attachment socket 25 is provided on the bottom wall of cover 12.

Front casing wall 13 is formed (Figures 5 and 7) with a shallow rectangular recess 26 that is open at its top as illustrated in Figure 7, and within this recess wall 13 is formed with an upper opening 27 for the finder light path and a lower opening 28 for the picture taking light path and the associated shutter mechanism.

Figure 16:
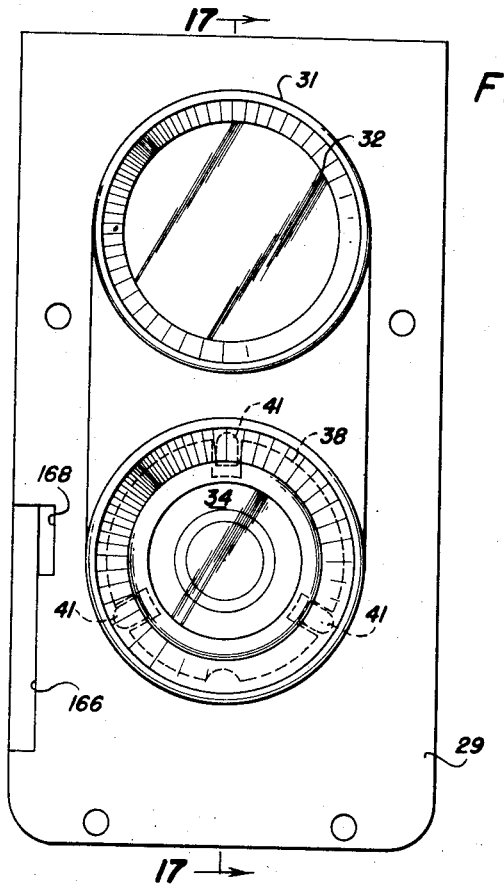
Figure 16 is a front elevation of the front lens board or plate.
Figure 17:
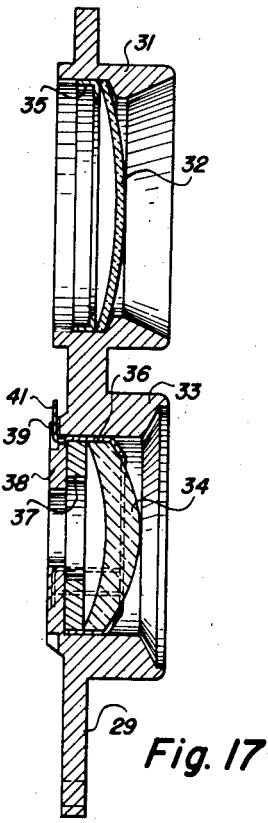
Figure 17 is a section on line 17—17 of Figure 16.

Recess 26 receives a lens board 29 (Figures 5 and 16) which is formed with an upper boss 31 containing the finder objective lens 32 and a lower boss 33 containing the main picture taking or objective lens 34 of the camera. Lens 32 is mounted on a shoulder in boss 31 by a suitable pressed-in rear retainer ring 35. Lens 34 (Figure 17) is mounted in a removable cell assembly that comprises a sheet metal cup 36 containing lens 34 and an annular spacer 37. An integral flange 38 at the inner end of boss 33 is formed with a circumferential series of openings 39 for receiving tongues 41 on the rim of cup 36, so that the lens, spacer and cup assembly may be inserted through the front of boss 33 until tongues 41 enter openings 39 and spacer 37 is pressed against flange 38, whereupon tongues 41 are bent over as illustrated in Figure 17 to secure the lens cell to the lens board. Thus both front lenses of the camera are mounted in a separable sub-assembly.

The finder cap and front plate sub-assembly is also preferably separately constructed. This comprises a finder cap 42, which is preferably a generally rectangular molded plastic frame, and a decorative front plate 43 of light sheet metal like aluminum that has its upper end turned over and secured to cap 42 as by screws 44 (Figure 5). Plate 43 extends downwardly at right angles to cap 42. An elongated aperture 45 is formed in plate 43 to clear the lens board bosses in the final assembly as illustrated in Figure 1.

Figure 2:
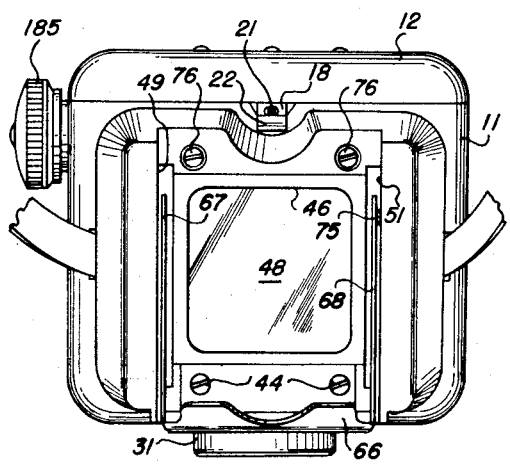
Figure 2 is a top plan view of the camera of Figure 1 with the finder hood open.
Figure 4:
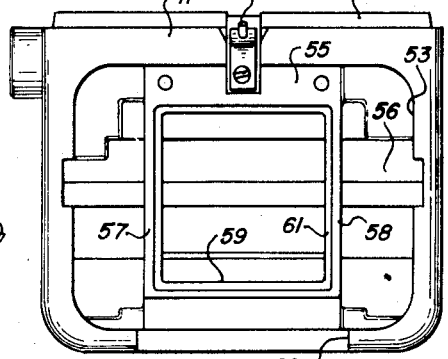
Figure 4 is a top plan view of the body casing of the camera of Figures 1–3, with the finder parts and the back cover removed to show its internal construction.

As illustrated in Figure 2, finder cap 42 is formed with a rectangular central opening 46 surrounded at its bottom by a recessed shoulder 47 that seats upon the finder view lens 48 (Figure 5). Cap 42 is also formed with parallel through slots 49 and 51 on opposite sides of opening 46. In the camera assembly, a depending rim on finder cap 42 fits within an opening 53 (Figure 4) in the top of casing 11, and at its rear rim 52 is interrupted to provide a flat face adapted to seat on a corresponding flat face 55 (Figure 4) on the casing.

Within casing 11, a stepped forwardly and downwardly inclined integral wall 56 (Figure 5) separates the upper finder compartment from the lower shutter compartment and joins front wall 13 below opening 27. Two internal walls 57 and 58 (Figure 4) parallel to the camera side walls extend integrally up from wall 56 and define two sides of an opening 59 having a recessed shoulder 61 adapted to seat a finder view lens spring frame 62.

A horizontal finder view lens 48 mounted upon frame 62 is optically aligned with lens 31 in the assembly, a reflector 64 being cemented upon wall 56 at forty five degrees to the entering light path.

A finder view lens hood 66 having integral side walls 67 and 68 extending through slots 49 and 51 is suitably pivoted upon cap 42. When the hood is in closed position, the hood side walls descend into the spaces between walls 57 and 58 and the sides of casing 11.

The casing 11, lens board 29 and finder and hood assembly are assembled together readily and easily. First, the lens board 29 is seated in recess 26. Then the finder cap 42, with the hood assembled on it, is placed on the top of the casing with openings 46 and 59 in registry. Two screws 74 (Figure 2) rigidly secure cap 42 to casing 11. When screws 76 are drawn tight lens 48 is clamped in its resilient seat between cap 42 and the casing. The front plate 43 covers the lens board except where the bosses project forwardly through aperture 45. Four screws 77 (Figure 1) extend through the front plate and lens board to secure both tightly to casing 11.

The above construction permits easy and speedly disassembly of the lenses and finder for repair, cleaning and replacement and the parts are readily assembled together again in exact alignment.

The shutter mount is a sub-assembly that correctly locates the shutter with respect to the optical axis of lens 34 and is removably attached to casing 11. This shutter mount comprises a light tight tubular support member 78 shaped like a truncated pyramid. It is preferably of molded plastic and has a large substantially square rear opening 79 (Figure 6) and a wall 81 across its smaller front end. Centrally and forwardly projecting from wall 81 (Figure 8) is a frusto conical boss 82 having an aperture 83 which is the exposure aperture to be controlled by the shutter.

The shutter, later to be described, is mounted on the front of wall 81 within a recess bounded by a flange 84. The entire shutter mount 78 is secured to the casing 11 by three screws 85 (Figure 7) which are disposed below the level of the lens board and pass through wall 13 into suitable threaded bores 80 in flange 84. The shutter mount 78 therefore must be attached to the casing 11 before lens board 29 is placed in recess 26 in this embodiment.

For guiding shutter mount 78 into proper assembly with casing 11, the latter is formed with upper internal side wall notches 86 and 87 (Figure 6) for guiding ribs 88 and 89 respectively on the shutter mount. Also at a lower level casing 11 is formed with two internal side wall recesses 91 and 92 to receive and guide two spring tabs 93 and 94 projecting from the sides of mount 78. Preferably tabs 93 and 94 are integral extensions of metal plates 95 and 96 respectively riveted to the sides of mount 78 having integral forwardly projecting spring arms 97 and 98 for holding the ends of a supply film spool mounted in spring clip 100.

Plates 95 and 96 are also provided with integral tabs 99 and 101 for freely rotatably supporting a film contacting guide roller 102 just below the level of the recessed film track 103 in the rear face of shutter mount 78. Aprons 104 and 105 secured to mount 78 project forwardly above arms 97 and 98 and shield the shutter mechanism, later to be described, from the supply film roll in clip 100.

The shutter assembly comprises a shutter blade 106 having an elongated aperture 107 and swingable about a pivot pin 108 on wall 81. A cover blade 109 having an aperture 111 is also pivoted on pin 108 in overlying relation to the shutter blade. Figures 5 and 7 illustrate the parts in the relative positions they occupy after an exposure has been made and before a fresh area of film has been advanced into the exposure aperture. An area 110 of the front surface of cover blade 109 is colored red to serve as an indicator of the shutter and film feed condition as will appear.

A spring 112 anchored to wall 81 at one end and attached at its other end to a tab 113 on shutter blade 106 constantly urges the shutter blade counterclockwise. The engagement of tab 113 with boss 82 or some other equivalent stop limits such counterclockwise movement of shutter blade 106 and stops the latter with the opaque portion 114 over aperture 83.

A spring 115 anchored to wall 81 at one end is attached at its other end to a tab 116 projecting from cover blade 109 and constantly urges blade 109 counterclockwise. A cover blade lever comprising a bell crank 117 is pivoted at 118 to wall 81. A connector link 119 is pivotally connected at opposite ends to arm 121 of the bell crank and tab 116 of the cover blade. Engagement of link 119 with boss 82 or an equivalent stop serves to stop such counterclockwise rotation of the cover blade.

A shutter blade latch 122 is pivoted intermediate its ends to wall 81 at 123. At one end latch 122 carries a tab 124 attached to one end of a spring 125 that has its other end anchored on wall 81 and constantly urges latch 122 counterclockwise about its pivot. A projection 126 formed on latch 122 provides a safety stop face coacting with a tab 127 on the rim of shutter blade 106 for preventing return of the shutter blade from the cocked position of Figure 12. Outwardly of projection 126 on latch 122 is an inclined cam face 130 adapted to be engaged by tab 127 during cocking of the shutter to slightly rock latch 122 clockwise and permit tab 127 to pass beyond the projection 126, the spring 125 returning to latch to blade arresting position after tab 127 has passed the stop projection.

Cam tab 128 on the latch is adapted to be engaged by a tab 129 projecting from the cover blade 109 during counterclockwise rotation of the cover blade to trip the latch 122 and release the shutter blade during operation as will appear.

A tab 131 projecting inwardly from the periphery of cover blade 109 is adapted to engage and pick up the shutter blade 106 when bell crank 117 is rocked during the clockwise cocking operation.

The shutter is set or cocked by rocking bell crank 117 counterclockwise in Figure 12. Arm 132 of the bell crank projects beyond the edge of wall 81 and is apertured at 133 to receive the tip of a lever 134 pivoted at 135 on mount 78. A pivot pin 136 projects from an upright reset pawl lever 137 into a vertically elongated slot 138 formed in the rear end of lever 134 which is also provided with an upstanding projection 139. A tension spring 141 resiliently interconnects the upper end of projection 139 with pin 136 to permit lost motion or overtravel consisting of relative vertical movement between the reset pawl 137 and lever 134 during operation for a purpose to appear.

A tension spring 142, connected at opposite ends to a projection 143 on pawl 137 and an anchor on mount 78, constantly tends to swing pawl 137 clockwise into the position illustrated in Figure 5. This spring 142 is the main shutter drive spring.

A shutter latch 144 slotted at 145 for sliding movement on a stationary pin 146 projects slidably through a slot 147 in flange extension 148 to terminate in a button 149 that projects through an aperture 151 of wall 13 to be available to the operator. A spring 152 anchored at one end to mount 78 has its other end attached to a projection 140 on latch 144 for constantly pulling the latch to the right in Figure 5.

At its rear end, latch 144 is formed with an outwardly turned lip 153 having a flat front face 154 and a bottom edge 155. The lower end of reset pawl 137 has an inturned bottom lug 156 adapted to lie in contact with face 154 when the parts are in the position of Figure 5. Above lug 156 is an inturned lug 157 adapted to contact face 154 when the parts are in the position of Figure 11 as will appear.

Provision is made for taking either instantaneous or time exposures. A time stop lever 158 is loosely pivoted on the shutter mount inwardly of the shutter latch 144 and is constantly biased clockwise by a tension spring 159 anchored at one end to the support. Lever 158 is formed with a depending arm 161 in sliding contact with an inwardly turned lug 162 on shutter latch 144. The other end of lever 158 is bent at right angles around the edge of wall 81 to provide a front abutment 163 (Figure 12). When latch 144 is moved inwardly to make an exposure as will appear, this moves arm 161 rearwardly and permits spring 159 to rock lever 158 clockwise thereby moving abutment 163 downwardly and outwardly to intercept lug 127 on the shutter blade and thereby stop the shutter blade with opening 107 over exposure aperture 83 for a time exposure as illustrated in Figure 15. When the operator takes his finger off button 149 to permit the shutter latch to be spring urged outwardly to its original position, lug 162 on the shutter latch positively rocks abutment 163 out of the path of the shutter blade with a camming action permitted by the shutter spring 112. This operation constitutes a time exposure.

Figure 19:
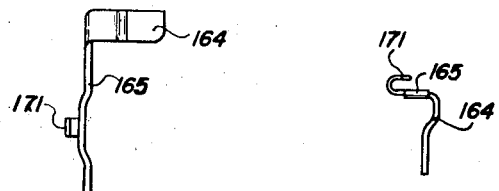
Figure 19 is a side elevation of the time stop lever.
Figure 20:
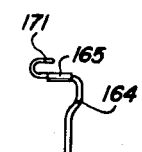
Figure 20 is a top elevation of the time stop lever.
Figure 18:
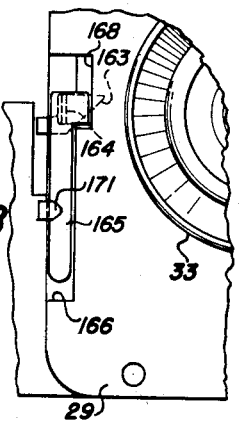
Figure 18 is a fragmentary elevation of the front of the camera illustrating the lever for setting the shutter mechanism for time or instantaneous exposure.

When an instantaneous exposure is desired, provision is made for preventing abutment 163 from rocking into the path of the shutter blade when latch 144 is moved inwardly. This is accomplished in the preferred embodiment (see Figures 18–20) by introducing a stop arm 164 into abutment with abutment 163 so as to prevent clockwise rocking of lever 158 when the latch 144 is moved inwardly. Stop arm 164 is an integral inward extension of a slide member 165 mounted for slidable movement in a narrow front surface recess 166 on lens board 29 and which is confined in that recess by overlying front plate 43. Arm 164 extends through slot 167 (Figure 18) into the shutter mechanism space to engage abutment 163. As illustrated in Figure 1, front plate 43 is provided with indicia 168 and 169 marked time and instantaneous exposures respectively. Slide member 165 is also formed with a pointer projection 171 that extends laterally into a surface recess 172 on the casing 11 and then outwardly and back across the front face of plate 43 to coact with either indicia.

When the parts are in such position that pointer 171 is opposite lower indicia 169, the stop arm 164 is in position to engage abutment 163 and thereby arrest rocking movement of lever 158 to permit an instantaneous exposure. When the pointer 171 is moved up opposite indicia 168, stop arm 164 is moved above abutment 163 to permit rocking of lever 158 in making a time exposure as above explained.

A switch for energizing a flash lamp in synchronization with the shutter action is provided in the assembly. This switch comprises a fixed contact 173 (Figures 8 and 10) riveted on the shutter mount and having a projecting spring blade 174. A contact member 175 (Figure 5) is slidably and pivotally mounted by a pin and slot connection 176 upon an upstanding arm 177 on latch 144. A tension spring 178 attached between the lower end of member 175 and arm 177 normally urges contact member 175 upwardly. An inwardly turned blade 179 extends from the top of member 175 above the top of spring blade 174 so that when the parts are in the position of Figures 5 and 7 the contact blades are separated.

During the shutter setting operation there is no vertical movement of latch 144 and hence no change in the separated relation of the contact blades 174 and 179, so that there can be no accidental flash of the lamp. An inwardly projecting lug 181 (Figures 8 and 10) is formed on the metal reset pawl lever and lug 181 is adapted to engage the top of contact member 175 and move it downwardly against the opposition of spring 178 until blades 174 and 179 are in contact during the exposure operation. Stationary contact 173 is suitably connected to one terminal of a socket in the side of the camera for attachment of a flash lamp holder, and either contact 175 or the reset pawl lever are connected to the other terminal of the socket. The entire contact member 175 moves bodily inwardly with latch 144 when button 149 is pressed to make an exposure, thereby moving member 175 into the path of the descending lug 181, and when the operator releases button 149 the latch 144 is moved outwardly by spring 152 and carries with it the contact member 175, which latter is moved out from beneath lug 181 to permit spring 178 to separate the contact blades. Consequently there is no closure of the switch during shutter setting, and the switch blades are immediately automatically separated after exposure.

The upper end of reset pawl 137 is formed with a tooth 182 adapted to engage a ratchet wheel 183 fixed to a unidirectional rotatable shaft or take-up spindle 184 that projects through the side wall of casing 11 to terminate in a manual knob 185. The inner end of shaft 184 is shaped in the usual manner to interfit with a spool upon which the film is wound. When knob 185 is turned to rotate ratchet wheel 183 clockwise in Figure 5, pawl 137 is moved downwardly, lug 156 sliding along face 154 until it clears the lower edge 155. At this time the engagement of ratchet wheel 183 with the relatively long tip 190 of the pawl 137 cooperates with spring 142 to swing the entire pawl 137 clockwise about pivot 136 to seat lug 156 under edge 155 and disconnect tooth 182 from wheel 183, as illustrated in Figure 11.

Figures 5 and 7 illustrate the shutter and film mechanism parts in the positions they occupy preliminary to winding the film and setting the shutter. Pawl tooth 182 is engaged with ratchet wheel 183 and lug 156 is urged against latch face 154 by spring 142. Latch 144 is urged to its outermost position by spring 152. The shutter and cover blades are in their extreme counterclockwise position and signal area 110 is not visible through lens 34.

In order to set the shutter and wind the film the operator simply rotates knob 185 clockwise. As above explained, this moves pawl 137 down until the combined actions of the ratchet wheel and tensioned spring 142 swing the pawl clockwise and lodges lug 156 under edge 155 of latch 144. This action also disconnects the pawl 137 from ratchet wheel 183 as illustrated in Figure 11 so that further turning of the knob 185 necessary to wind the film the proper distance has no effect on the shutter setting mechanism. A stop pin 180 limits the swing of pawl 137. This downward movement of pawl 137, through the connection provided by pin 136 and spring 141, rocks lever 134 counterclockwise about pivot 135 and thereby rocks cover blade lever 117 into the position illustrated in Figure 12 where signal area 110 is visible through lens 34. Both the shutter blade and cover blade are thereby rocked as a unit from the Figure 7 position to the Figure 12 position without uncovering aperture 83. Springs 112, 115 and 142 are all tensioned during this movement and the parts are retained in this position by the lock of lug 156 under latch edge 155. Should the lever 134 and the shutter reach reset position before lug 156 has moved down to the level of edge 155, slot 138 permits pin 136 to move down against the tension of spring 141 and make the necessary overtravel.

The shutter is now set for either instantaneous or time exposures. If instantaneous exposures are desired, pointer 171 is moved down to index 169 thereby placing stop 164 in the path of time stop lever 158 and rendering lever 158 inoperable.

After sighting through the finder the operator presses button 149 to make the exposure. Inward movement of latch 144 moves edge 155 past lug 156 to release pawl 137 and enable shutter drive spring 142 to pull the pawl upward along face 154 and rock lever 134 clockwise. When the operator releases the head 149, outward movement of latch 144 restores pawl tooth 182 into contact with ratchet 183 Cover blade lever 117 is rocked counterclockwise by lever 134 to enable counterclockwise rotation of cover blade 109 by spring 142 aided by spring 115. The chief function of the considerably lighter spring 115 is to take up mechanical play in the linkage. Shutter blade 106 starts to follow the cover blade under the influence of spring 112, but is immediately stopped by the engagement of tab 127 with stop 126 of latch 122, with opening 107 over aperture 83.

As cover blade 109 continues to move counterclockwise, this transient condition being illustrated in Figure 13, its aperture 111 moves across the aperture 83 to make the exposure. At the same time, engagement of tab 129 with latch cam 128 releases the shutter 106 to complete its counterclockwise travel under the influence of spring 112. The parts stop with the exposure aperture covered by blade 106 as in Figure 7, and with cover blade aperture 111 aligned with aperture 83.

In order to make a fresh exposure the knob 185 is turned again while the operator watches the numbers on the back of the film through window 23. The shutter is automatically set in this operation as above described.

When it is desired to make a time exposure, pointer 171 is moved up opposite index 168 and this frees lever 158 to rock under the influence of spring 159 when button 149 is pressed inwardly. The operation of the shutter and cover blades is substantially the same as for an instantaneous exposure, with the exception that, while cover blade 109 moves as before to its extreme counterclockwise position to stop with aperture 111 aligned with aperture 83, shutter blade 106 is stopped with the exposure aperture uncovered, by engagement of lug 127 with abutment 163 of the time stop lever. This condition prevails until the operator releases latch 144 which rocks lever 158 to remove abutment 163 from the path of shutter blade 106 and thus enables the shutter blade to complete its movement and terminate the exposure.

During both of the above types of exposure, the contacts 174 and 179 are closed when the exposure aperture 83 is fully open.

The camera of the invention is compact and easy to assemble and repair. Double exposures are preventable. The operator, by a glance through lens 34, can tell whether he remembered to advance the film after the last exposure.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. In a camera having a wall provided with an exposure aperture, a shutter blade pivoted on said wall and having an opening, a cover blade pivoted on said wall and having an opening said blades extending in closely overlapped relation and said opening being adapted for selective register with said exposure aperture, means for rotating said blades in one direction substantially as a unit past said aperture with said openings out of registry to set the shutter without making an exposure, means for holding said blades in shutter set position, resilient means energized by said movement to shutter set position for independently biasing said blades to rotate in the direction opposite that in which they were rotated to shutter set position, means releasing the cover blade for return movement, latch means for said shutter blade having a portion in the path of the moving cover blade so as to be directly actuated by the cover blade during said return movement for releasing the shutter blade for return movement in such timing that both of said openings register with each other and said aperture for a predetermined exposure time during said return movement, and means for stopping said blades after said return movement with said openings out of registry and with one of said blades closing said aperture.

2. In a camera having an exposure aperture, a cover blade having an aperture, a shutter blade having an aperture, a common pivot for said blades and said blades extending in closely overlapped relation with said blade apertures adapted for registry with each other and said exposure aperture, manually operated mechanism connected to said cover blade and including an operable connection to said shutter blade for rotating said blades together past the exposure aperture with said blade apertures out of registry to move them into cocked position without uncovering said exposure aperture, a cover blade spring tensioned by said rotation of the cover blade and a shutter blade spring tensioned by said rotation of the shutter blade, said springs biasing said blades for return movement in the direction opposite to that they were moved by said mechanism means latching said mechanism in cocked position, manually operable latch releasemeans permitting opposite spring urged rotation of said cover blade, a stop for arresting rotation of said shutter blade with its aperture aligned with the exposure aperture when said cover blade so starts to oppositely rotate, said stop having a portion disposed in the path of said return rotation of said cover blade, and means on said cover blade for engaging said portion and removing said shutter blade stop during said opposite rotation of said cover blade after said cover blade aperture has started to move over said exposure aperture and an exposure has commenced through said apertures to permit opposite rotation of said shutter blade under the pull of said shutter spring.

3. In a camera having an exposure aperture, a shutter comprising a cover blade and a shutter blade having a common pivot, each of said blades having an opening adapted to register with said aperture and said blades extending in closely overlapped relation, means for rotating said blades together as a unit in one direction past said aperture with said openings out of registry to cock the shutter without uncovering said aperture, resilient means energized by said blade rotation for independently biasing said blades for rotation in the opposite direction, and means for making an exposure comprising means for first releasing said cover blade for rotation in the opposite direction and with its opening over said aperture, stop means effective immediately after release of said cover blade for arresting said shutter blade against rotation in the opposite direction until said cover blade has rotated a predetermined amount, and means on said cover blade directly engaging and releasing said stop means after the opening in the cover blade has started to move over said exposure aperture and exposure has commenced and permitting opposite movement of said shutter blade to complete the exposure.

4. In the camera defined in claim 3, said cover blade having a projection for picking up said shutter blade during rotation in said one direction and another projection for engaging said stop means during rotation of said cover blade in the opposite direction.

5. In a camera having an exposure aperture, a shutter assembly comprising an apertured cover blade and an apertured shutter blade mounted on a common pivot axis, said blades extending in closely overlapped relation and having their apertures adapted for registry with each other and the exposure aperture, mechanism for rocking said assembly as a unit past said aperture with said blade apertures out of registry to set the shutter without making an exposure, springs connected to the respective blades tensioned by said setting operation, means releasing said cover blade for return movement, a stop effective when said cover blade starts said return movement for arresting return movement of said shutter blade beyond a position where its aperture registers with said exposure aperture, means on said cover blade operative during said return movement of the cover blade for removing said stop and permitting return movement of said shutter blade, means for stopping said return movement of the cover blade with its aperture aligned with said exposure aperture, and a further stop adjustable into the path of said shutter blade for temporarily arresting it with its aperture also aligned with the exposure aperture to make a time exposure.

6. In a camera having a body provided with an exposure aperture, a cover blade having an aperture, a shutter blade having an aperture, said blades extending in closely overlapped relation and their apertures being adapted for registry with each other and the exposure aperture, a common pivot for said blades on said body, manually operated mechanism comprising a lever pivoted on said body and pivotally connected to said cover blade and coacting means on the blades for rotating said blades together past the exposure aperture with their apertures out of registry and into cocked position without uncovering said aperture, a cover blade spring tensioned by said rotation of the cover blade and a shutter blade spring tensioned by said rotation of the shutter blade, means latching said mechanism in cocked position, manually operable latch release means permitting opposite spring urged rotation of said cover blade, a pivoted latch lever providing a stop for arresting rotation of said shutter blade after said cover blade has been released and while the shutter blade aperture is over the exposure aperture, and means on said cover blade adapted to engage said latch lever for removing said shutter blade stop after said cover blade aperture has started to register with said exposure aperture and an exposure has commenced through said apertures.

7. In a camera having an exposure aperture, a shutter comprising a cover blade and a shutter blade having a common pivot, said blades extending in closely overlapped relation and each having an opening adapted to register with the other and with said aperture, means for rotating said blades together as a unit in one direction past said aperture with said openings out of registry to cock the shutter without uncovering said aperture, and means for making an exposure comprising means for releasing said cover blade for opposite rotation, a spring biased latch for engaging and arresting said shutter blade against rotation with its opening over said exposure aperture and until said cover blade has rotated a predetermined amount, and a projection on said cover blade adapted to engage and rock said latch during said opposite rotation of said cover blade for releasing said shutter blade after the cover blade aperture has started to register with said exposure aperture and exposure has commenced and permitting opposite movement of said shutter blade to complete the exposure.

8. In a camera having an exposure aperture, a shutter assembly comprising an apertured cover blade and an apertured shutter blade mounted on a common pivot axis, said blades extending in closely overlapped relation and said blade apertures being adapted to register with each other and said exposure aperture, mechanism for rocking said assembly as a unit past said aperture with said blade apertures out of registry to set the shutter without making an exposure, springs connected to the respective blades tensioned by said setting operation, means releasing said cover blade for return movement, a stop arresting return movement of said shutter blade with its aperture over said exposure aperture, means on said cover blade removing said stop during said return movement of said cover blade and permitting return movement of said shutter blade, means stopping return movement of said cover blade with its aperture aligned with said exposure aperture, a further stop movable into the path of said shutter blade for again arresting it with its aperture also aligned with the exposure aperture to make a time exposure, means actuated by said releasing means for so moving said further stop, and adjustable means for locking said further stop against movement into the path of said shutter blade for obtaining an instantaneous exposure.

9. In a camera, a support provided with a front wall having an exposure aperture, shutter and cover blades pivoted on the front wall of said support to extend in closely overlapped relation and each provided with an exposure control opening adapted to register with each other and the exposure aperture, a bell crank pivoted on the front wall of said support, a link pivotally connecting the cover blade to one arm of said bell crank, an actuating lever movably mounted on said support and operatively connected to the other arm of said bell crank, means for interconnecting said blades for movement together with their openings out of registry across said aperture without making an exposure when the actuating lever is moved in one direction, and spring powered means on said support for controllably moving said blades across said aperture in such synchronized relation so as to register said openings with each other and said aperture for making an exposure during transit when said actuating lever is moved in the other direction, means for latching said actuating lever when it has been moved to said one position, and a manual control member shiftable to unlatch said lever and permit it to move to said other position.

10. In the camera defined in claim 9, means stopping return movement of said cover blade with its opening aligned with said exposure aperture, a spring biased time stop lever pivoted on said support adapted to be moved into the path of said shutter blade to arrest said shutter blade with its opening over said aperture to provide a time exposure when said control member is moved to unlatch said actuating lever, and a stop shiftably mounted on said camera between one position where it is disposed in the path of said time stop lever to prevent said time stop lever from arresting said actuating lever when an instantaneous exposure is to be made and another position where it is out of said path.

11. In a camera having an exposure aperture, a pivoted shutter blade having an opening, means for moving said blade in one direction over said aperture, means for covering said opening while said blade is so being moved, a spring for moving said blade in the opposite direction, means for latching said blade after completion of said movement in said one direction, a movable control member operably connected to release said latch, a movable time stop lever, means for moving said time stop lever into the path of said blade to register said opening with said aperture for a time exposure when said control member is moved to release said latch, and a manually controlled stop on said camera mounted for movement into the path of said control member to prevent said movement of said control member when an instantaneous exposure is desired.

12. In the camera defined in claim 11, said time stop lever comprising a pivoted lever having a part engaging a part on said control member, and a spring so biasing said time stop lever as to move said time stop lever into the path of said blade when the control member is actuated to release the latch, said engaged parts positively returning the time stop lever to initial position when the control member is restored to its initial position.

13. In a camera, a pivoted shutter blade, a coaxially pivoted cover blade, said blades extending in closely overlapped relation and being provided with openings adapted to register with each other and the exposure aperture, means for moving said blades together with their openings out of registry in one direction to shutter cocked position, resilient means energized by said movement and adapted for moving said blades in the opposite direction to make an exposure, means for latching both blades in said shutter cocked position, manual means for releasing said latching means to permit the start of return movement of both blades by said resilient means, a pivoted spring biased shutter blade latch, a first projection on said shutter blade adapted to engage and rock said latch to permit passage of said shutter blade during movement to cocked position, means on said latch engaging said first projection immediately after said shutter blade has been released for return movement for retaining the shutter blade in substantially cocked position and with its opening in registry with the exposure aperture, and a second projection on said cover blade adapted to engage and rock said latch to release said shutter blade during return movement of said cover blade and only when said cover blade has moved a predetermined distance in the return direction.

References Cited in the file of this patent

UNITED STATES PATENTS

| | | |
|---|---|---|
| 573,953 | Younger | Dec. 29, 1896 |
| 2,179,718 | Fedotoff | Nov. 14, 1939 |
| 2,271,562 | Lotz | Feb. 3, 1942 |
| 2,353,893 | Hineline | July 18, 1944 |
| 2,422,018 | Hutchison | June 10, 1947 |
| 2,490,755 | Hutchison | Dec. 6, 1949 |
| 2,531,936 | Fairbank et al. | Nov. 28, 1950 |
| 2,641,978 | Lawson | June 16, 1953 |

FOREIGN PATENTS

| | | |
|---|---|---|
| 19,480 | Great Britain | of 1890 |
| 71,337 | Germany | Nov. 4, 1892 |